United States Patent [19]

Kobayashi et al.

[11] Patent Number: 4,545,975

[45] Date of Patent: Oct. 8, 1985

[54] PROCESS AND APPARATUS FOR PRODUCING A HIGH PURITY MAGNESIA FINE POWDER

[75] Inventors: Waichi Kobayashi; Kozaburo Yoshida; Hideaki Igarashi, all of Ube, Japan

[73] Assignee: UBE Industries, Ltd., Ube, Japan

[21] Appl. No.: 610,650

[22] Filed: May 16, 1984

[30] Foreign Application Priority Data

May 20, 1983 [JP] Japan .................. 58-88889

[51] Int. Cl.$^4$ .............................. C01B 33/18
[52] U.S. Cl. ................... 423/636; 422/111; 422/202
[58] Field of Search ......................... 423/636

[56] References Cited

U.S. PATENT DOCUMENTS

| | | | |
|---|---|---|---|
| 2,273,707 | 2/1942 | Heath et al. | 423/636 |
| 2,454,733 | 11/1948 | Dahl | 423/636 |
| 3,451,773 | 6/1969 | Müller | 423/636 |
| 3,848,068 | 11/1974 | Rice | 423/636 |
| 3,899,573 | 8/1975 | Shaw et al. | 423/636 |

FOREIGN PATENT DOCUMENTS 139208  5/1970  Czechoslovakia .

Primary Examiner—John Doll
Assistant Examiner—Wayne A. Langel
Attorney, Agent, or Firm—Finnegan, Henderson, Farabow, Garrett & Dunner

[57] ABSTRACT

A high density magnesia fine powder having an improved sintering property is produced in such a manner that magnesium is vaporized at 700° C. or more in a magnesium-vaporizing refractory tube while an inert gas flows through the magnesium-vaporizing tube; the flow of the vaporized magnesium-containing inert gas is introduced into a magnesium-oxidizing tube; a molecular oxygen-containing gas is introduced into the magnesium-oxidizing tube in a concurrent relationship to the flow of the vaporized magnesium-containing inert gas to provide a reaction mixture, while the temperature of the magnesium-oxidizing region is adjusted to 800° C. to 1600° C. and the partial pressures of the vaporized magnesium and oxygen in the magnesium-oxidizing region are regulated to 0.09 atmospheres or less and ½ times or more that of the vaporized magnesium; the flow of the reaction mixture containing the resultant magnesia fine powder is introduced into a magnesium-collecting box; and the magnesia fine powder is collected from the reaction mixture.

7 Claims, 1 Drawing Figure

PROCESS AND APPARATUS FOR PRODUCING A HIGH PURITY MAGNESIA FINE POWDER

BACKGROUND OF THE INVENTION

1. Field of the Invention

The present invention relates to a process and apparatus for producing a high purity magnesia fine powder. More particularly, the present invention relates to a process and apparatus for producing a high purity magnesia powder which exhibit an improved sintering property.

2. Description of the Prior Art

It is well known that high purity magnesia exhibits an excellent heat resistance, electrical insulating property, and transparency, and therefore, is highly useful as a magnesia-type new ceramic material, for example, in high-quality porcelain articles, electrical insulators, heat resistant transparent materials, and infrared transmitting materials, for a wide field of industries.

Generally, the magnesia-type new ceramic materials are produced by shaping and sintering a ceramic powder comprising, as a principal component, magnesia (magnesium oxide, MgO). In the sintering procedure, the smaller the size of particles of the magnesia, the higher the density of the resultant sintered body, and the higher the density of the sintered body, the higher the mechanical, thermal, and transparency of the material.

In the conventional process of producing the sintered magnesia body, magnesia powders produced by calcining magnesia hydroxide or basic magnesium carbonate, are used as raw materials. However, because magnesia has a high melting point of about 2800° C., in order to produce a sintered body having a high density, usually it is necessary to carry out the sintering procedure at a high temperature of 1700° C. or more while the magnesia powder is hot-pressed.

The above-mentioned conventional sintering process is disadvantageous in that the process cost is high. Therefore, in order to reduce the sintering temperature to a level of from 1400° C. to 1600° C., and to reduce the process cost, the sintering property of the conventional magnesia powders is enhanced by mixing the magnesia powders with an additive comprising lithium fluoride (LiF), magnesium fluoride ($MgF_2$), or sodium fluoride (NaF), or by treating the magnesia powder with a treating agent, for example, benzene.

For example, Japanese Examined Patent Publication (Kokoku) No. 49-16246 discloses a process for producing a transparent sintered magnesia tube in which process magnesia powder mixed with lithium fluoride and boron oxide, magnesium borate or boric acid is used as a raw material.

Japanese Unexamined Patent Publication (Kokai) No. 50-153798 discloses a process for producing magnesia having an improved sintering property, in which process a magnesium compound mixed with a fluorine compound such as magnesium fluoride is calcined at a temperature of from 600° C. to 1200° C.

M. Banerjee and D. W. Budworth, Trans. Brit. Ceram. Soc., Vol., 71 (3), 51–53 (1972) disclose a process for the preparation of transparent magnesia bodies, in which process magnesia powder mixed with sodium fluoride was sintered at a temperature of from 1300° C. to 1700° C. However, the above-mentioned processes, in which an additive is added to magnesia powder, result in a sintered magnesia body having a decreased degree of purity of magnesia. The additive in the sintered magnesia body causes the characteristic properties of sintered body to be degraded and, therefore, the use of the resultant sintered body is restricted.

Japanese Examined Patent Publication (Kokai) No. 56-16108 discloses a process for producing a high density sintered magnesia body, in which process magnesia powder mixed with a liquid hydrocarbon such as benzene are treated at a temperature of from 300° C. to 650° C. in an oxygen atmosphere, before the sintering procedure.

O. Yamaguchi, H. Tonami, and K. Shimizu, Chem. Lett., Vol. 8, 799–802 (1970) disclose that magnesia powder having an improved sintering property is produced by calcining magnesium hydroxide which has been prepared from magnesium alkoxide.

However, the above-mentioned processes are disadvantageous in that the processes are undesirably complicated and are costly, and, therefore, the resultant magnesia powder is expensive.

Also, in the above-mentioned processes, the magnesia powder is prepared by calcining a magnesium salt or alkoxide. In the calcining procedure, the crystals of the magnesia grow and the grown magnesia crystals form agglomerates. Therefore, the resultant magnesia agglomerates should be mechanically pulverized before the sintering procedure. However, even if the mechanical pulverizing procedure is applied to the magnesia powder prepared from the magnesium salt or alkoxide, it is very difficult to make the size of the particles of the pulverized magnesia satisfactorily fine, and the resultant pulverized magnesia still contains a certain amount of the agglomerates. The magnesia particles having an undesirably large size and containing a certain amount of the agglomerates results in an unsatisfactorily decreased packing density of the magnesia powder. This phenomenon causes the production of a high density sintered magnesia body to be difficult and the characteristic properties thereof to be degraded.

It is also well known that magnesia powder can be produced by the combustion of metallic magnesium in an oxygen-containing atmosphere. This reaction can be utilized to produce magnesia powder by a gas phase method. For instance, Czechoslovakian Pat. No. 139,208 discloses a process and apparatus for producing high purity magnesia powder by oxidizing magnesium vapor with oxygen. In this process, a flow of an inert gas containing magnesium vapor is brought into contact with a flow of oxygen gas in countercurrent relationship to each other, at a temperature of 700° C. The resultant magnesia powder particles have a size of 1 μm or less. However, we have found that as long as the process of the Czechoslovakian patent is used, it is difficult to obtain very fine magnesia powder particles having a size of 0.1 μm or less.

SUMMARY OF THE INVENTION

An object of the present invention is to provide a process and apparatus for producing a high purity magnesia fine powder which exhibits an improved sintering property even without an additive or without treating the powder.

Another object of the present invention is to provide a process and apparatus for producing a high purity magnesia fine powder capable of being converted to a sintered magnesia body having a high density.

The above-mentioned objects can be attained by the process and apparatus of the present invention.

The process of the present invention for producing a high purity magnesia powder having an improved sintering property, comprises the steps of:

(A) vaporizing magnesium at a temperature of 700° C. or more in a magnesium-vaporizing region while flowing an inert gas through said magnesium-vaporizing region;

(B) introducing the flow of the inert gas containing the resultant vaporized magnesium into a magnesium-oxidizing region;

(C) flowing a molecular oxygen-containing gas concurrently with the flow of the vaporized magnesium-containing inert gas through the magnesium-oxidizing region to provide a reaction mixture, while the partial pressures of the vaporized magnesium and the oxygen gas in the resultant reaction mixture are regulated to 0.09 atmospheres or less and ½ times or more that of the vaporized magnesium, respectively, and the temperature of the magnesium-oxidizing region is adjusted to a level of from 800° C. to 1,600° C., to oxidize the vaporized magnesium with the molecular oxygen-containing gas into a high purity magnesia fine powder;

(D) introducing the flow of the reaction mixture containing the resultant magnesia fine powder into a magnesia-collecting region; and (E) collecting the high purity magnesia fine powder from the reaction mixture in the magnesia-collecting region.

The apparatus of the present invention for producing a high purity magnesia fine powder having an improved sintering property comprising:

(1) a magnesium-oxidizing refractory tube having a closed end thereof connected to a supply source of a molecular oxygen-containing gas and an opposite open end thereof;

(2) a magnesium-vaporizing refractory tube having a closed end thereof connected to a supply source of an inert gas and an opposite open end thereof, and extending in parallel to the longitudinal axis of the magnesium-oxidizing refractory tube, at least the open end portion of the magnesium-vaporizing tube having a smaller diameter than that of the magnesium-oxidizing refractory tube and being inserted into the magnesium-oxidizing tube through the closed end thereof;

(3) a magnesia-collecting box having an open end thereof removably connected to the open end of the magnesium-oxidizing refractory tube and an opposite closed end thereof connected to a vacuum pump and being provided with means for collecting the resultant high purity magnesia fine powder, located within the magnesia-collecting box; and (4) means for heating the magnesium-oxidizing refractory tube, located outside thereof.

DESCRIPTION OF THE PREFERRED EMBODIMENTS

Figure 1:
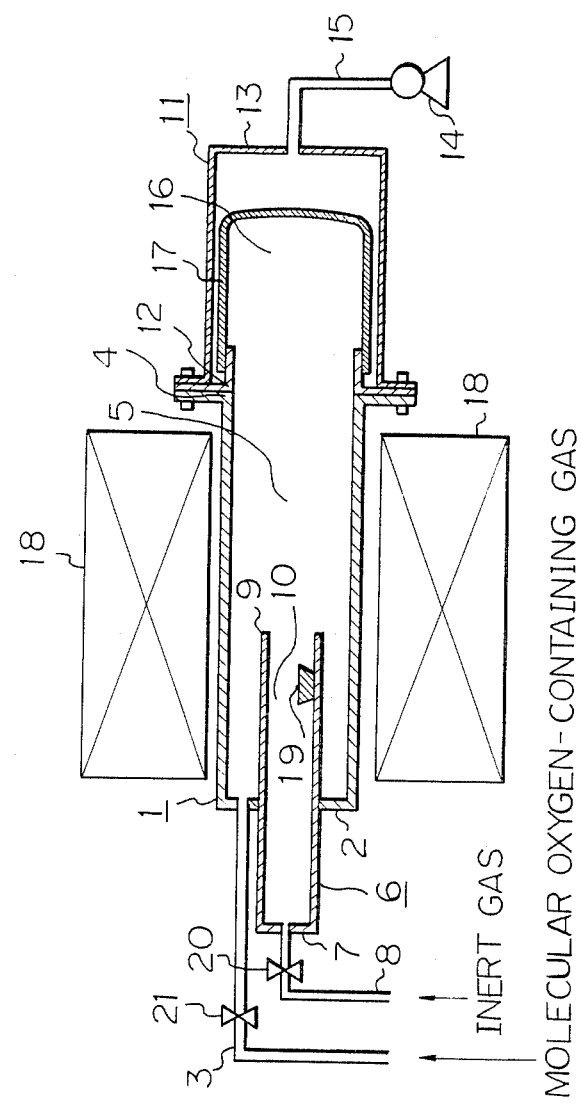
FIG. 1 is an explanatory cross-sectional view of an embodiment of the apparatus of the present invention.

In the process of the present invention, magnesium is placed in a magnesium-vaporizing region and is vaporized at a temperature of 700° C. or more, while an inert gas flows through the magnesium-vaporizing region.

The flow of the inert gas containing the vaporized magnesium is introduced into a magnesium-oxidizing region.

Separately, a flow of a molecular oxygen-containing gas is introduced into the magnesium-oxidizing region in a concurrent relationship to the flow of the vaporized magnesium-containing inert gas to provide a reaction mixture in which the vaporized magnesium is oxidized with oxygen gas into a high purity magnesia fine powder. In this magnesium-oxidizing procedure, the partial pressures of the vaporized magnesium and the oxygen gas in the reaction mixture are regulated to 0.09 atm or less and ½ times or more the partial pressure of the vaporized magnesium, respectively. Also, the temperature of the magnesium-oxidizing region is adjusted to a level of from 800° C. to 1,600° C.

The resultant high purity magnesia fine powder is introduced into a magnesia-collecting region by the flow of the reaction mixture and is separated from the reaction mixture in the magnesia-collecting region.

The above-mentioned process can be carried out by using the apparatus of the present invention. Referring to FIG. 1, in the apparatus of the present invention a magnesium-oxidizing refractory tube 1 has a closed end 2 connected to a supply source (not shown in the drawing) of a molecular oxygen-containing gas through a conduit 3 and an opposite open end 4. The magnesium oxidizing refractory tube 1 defines a magnesium oxidizing region 5.

In the apparatus of the present invention a magnesium-vaporizing refractory tube 6 has a closed end 7 connected to a supply source (not shown in the drawing) of an inert gas through a conduit 8 and an opposite open end 9 and defines a magnesium-vaporizing region 10. Magnesium to be vaporized is placed in the open end portion of the magnesium-vaporizing refractory tube 6. The magnesium-vaporizing refractory tube has a smaller diameter than that of the magnesium-oxidizing refractory tube 1 and extends in parallel to the longitudinal axis of the magnesium-oxidizing refractory tube 1. At least the open end portion of the magnesium-vaporizing refractory tube 6 is inserted into the magnesium-oxidizing refractory tube 1 through the closed end 2 thereof. The open end 9 of the magnesium-vaporizing tube 6 opens to the magnesium-oxidizing region 5.

In the apparatus of the present invention, a magnesia-collecting box 11 has an open end 12 removably connected to the open end 4 of the magnesium-oxidizing refractory tube 1 and an opposite closed end 13 connected to a vacuum pump 14 through a conduit 15. The magnesia-collecting box 11 forms a magnesia-collecting region 16 and is provided with means for collecting the resultant high purity magnesia fine powder, for example, a filter 17 located within the magnesia-collecting box 11.

The magnesium-oxidizing refractory tube 1 is surrounded by means for heating the tube 1, for example, an electric furnace 18.

The tubes 1 and 6 are made from a refractory material, for example, a porcelain.

In the process and apparatus of the present invention, magnesium 19 to be vaporized is placed in the magnesium-vaporizing region 10 formed in the magnesium-vaporizing refractory tube 6, and is vaporized at a temperature of 700° C. or more, preferably 700° C. to 1100° C.

If the vaporizing temperature is lower than 700° C., the vaporizing rate of magnesium is unsatisfactory and, therefore, the productivity of the high purity magnesia fine powder becomes undesirably poor.

The inert gas supplied from the supply source thereof through the conduit 8 flows through the magnesium-vaporizing region 10 and is introduced together with the vaporized magnesium into the magnesium-oxidizing region 5 formed in the magnesium-oxidizing refractory tube 1. The inert gas comprises at least one member selected from the group consisting of argon, helium, neon, and krypton.

The oxygen-containing gas is introduced from the supply source thereof into the magnesium-oxidizing region 5 through the conduit 3. The flow of the oxygen-containing gas in the magnesium-oxidizing region 5 is in the same direction as that of the flow of the vaporized magnesium-containing inert gas. When the oxygen-containing gas comes in contact with the vaporized magnesium-containing inert gas, to form a reaction mixture in the magnesium-oxidizing region 5, the vaporized magnesium is oxidized with oxygen gas and is converted to a high purity magnesia fine powder fluidized in the reaction mixture.

In the above-mentioned oxidizing procedure, the partial pressure of the vaporized magnesium in the reaction mixture is regulated to 0.09 atm or less, preferably, from 0.03 to 0.09 atm, the partial pressure of the oxygen in the reaction mixture is regulated to a level of $\frac{1}{2}$ times or more, preferably, from $\frac{1}{2}$ to 4 times, the regulated partial pressure of the vaporized magnesium, and the temperature of the magnesium-oxidizing region is adjusted to a level of from 800° C. to 1,600° C., preferably from 800° C. to 1300° C., by means of the electric furnace 18.

The partial pressures of the vaporized magnesium can be regulated to the desired value by controlling the temperature of the magnesium-vaporizing region 10 and the flow rate of the inert gas in the magnesium-vaporizing region 10. The flow rate of the inert gas can be controlled by means of a flow rate control valve 20 arranged in the conduit 8.

Also, the partial pressure of the oxygen gas can be regulated to the desired value by controlling the flow rate of the molecular oxygen-containing gas. The flow rate of the molecular oxygen-containing gas can be controlled by means of a flow rate control valve 21 arranged in the conduit 3.

If the partial pressure of the vaporized magnesium is more than 0.09 atmospheres and/or the partial pressure of the molecular oxygen is less than $\frac{1}{2}$ times that of the vaporized magnesium, the resultant magnesia powder has an unsatisfactorily large size.

Also, if the temperature of the reaction mixture is higher than 1600° C., the resultant magnesia powder has an undesirably large size. When the temperature of the magnesim-oxidizing region is lower than 800° C., an undesirable suboxide of magnesium is produced.

Each of the flow rates of the vaporized magnesium-containing inert gas and the molecular oxygen-containing gas in the magnesium-oxidizing region 5 is controlled to such an extent that the vaporized magnesium resides in the magnesium-oxidizing region 5 for 0.2 to 3.0 seconds. If the residence time of the vaporized magnesium is more than 3.0 seconds, the resultant magnesia powder sometimes has an undesirably large size. Also, when the residence time is less than 0.2 seconds, the resultant magnesia powder contains a certain amount of undesirable magnesium suboxide. When the magnesia powder containing the magnesium suboxide is sintered, the resultant sintered product exhibits a significantly degraded electrical insulating property.

The reaction mixture containing the resultant magnesia fine powder is introduced from the magnesium-oxidizing region 5 into the magnesia-collecting region 16 formed in the magnesium-collecting box 11. The magnesium fine powder is separated and collected from the reaction mixture by means of the filter 17, and the residual gas is discharged from the magnesium-collecting box 11 through the conduit 15 by means of the vacuum pump 14.

The resultant high purity magnesia fine powder has a high chemical activity. If allowed to come in contact with air, the magnesia fine powder tends to adsorp carbon dioxide and water vapor from the air. In order to protect the resultant high purity magnesia fine powder from being in contact with air, it is preferable that the magnesia-collecting region 16 be completely shielded from air, i.e., made airtight, by the magnesia-collecting box 11.

Usually, the oxidation reaction of vaporized magnesium is carried out under the ambient pressure or a reduced pressure. The pressure in the magnesium-oxidizing region 5 is maintained at a desired level by means of the vacuum pump 14.

The magnesia-collecting box 11 is removably connected to the magnesium-oxidizing refractory tube 1, as indicated in the drawing. After the oxidation procedure of the vaporized magnesium is completed, the magnesium-collecting box 11 is removed from the magnesium-oxidizing refractory tube 1 and the resultant magnesia fine powder collected on the filter 17 is recovered.

The high purity magnesia fine powder produced in accordance with the process and apparatus of the present invention has a size of 0.03 $\mu$m or less, usually, 0.015 $\mu$m or less, calculated from a specific surface area determined by means of the adsorption of nitrogen in accordance with the Brunauer, Emmett and Teller's method (BET method), and are in the form of cubic periclase crystals. The fine powder contains substantially no agglomerates. Accordingly, the high purity magnesia fine powder of the present invention can be easily converted to a shaped body and then to a sintered body having a very high density.

Also, since no pulverizing procedure for the magnesia fine powder is necessary, the magnesia fine powder is never contaminated by impurities which are usually included through the pulverizing procedure.

The magnesia fine powder of the present invention has a high degree of purity of 99.9% or more, which is about the same as the purity of the metallic magnesium used.

The high purity magnesia fine powder of the present invention exhibit a highly improved sintering property without using an additive or without surface-treating. Therefore, the magnesia fine powder can be easily converted to a sintered magnesia body having a high density of, for example, 3.51 or more, at a relatively low sintering temperature level of, for example, 1300° C.

Accordingly, the high purity magnesia fine powder produced in accordance with the present invention is useful as a new ceramic material for producing high-quality porcelain products, electrical insulators, heat resistant transparent products, and infrared transmitting products.

The present invention in illustrated in detail by the following non-limiting examples and comparative example.

Examples 1 to 3

In each of Examples 1 to 5, high purity magnesia fine powder was produced by using the apparatus as shown in FIG. 1 of the drawing.

A magnesium mass having a degree of purity of 99.9% was placed in the magnesium-vaporizing region 10 formed in the magnesium-vaporizing refractory tube 6. An inert gas consisting of argon having a degree of plurality of 99.99% was introduced into the magnesium-vaporizing region 10. The magnesium was heated at a temperature of 900° C. and the partial pressure of the resultant vaporized magnesium in the magnesium-oxidizing region 5 was regulated to 0.04 atm. Oxygen gas having a degree of purity of 99.6% was introduced into the magnesium-oxidizing region 5 in the same direction as that of the flow of the vaporized magnesium-containing argon gas while the total pressure of the resultant reaction mixture was adjusted to 1.0 atmosphere and the partial pressure of the oxygen gas was adjusted to 0.2 atm. Also, the temperature of the magnesium-oxidizing region was adjusted to 1,000° C.

The residence time of the vaporized magnesium in the magnesium-oxidizing region was controlled to the value indicated in Table 1

The resultant magnesia fine powder was separated from the reaction mixture by means of a filter 17 in the magnesia-collecting region 16.

The size (BET method) of the resultant magnesia fine particles is indicated in Table 1.

The collected magnesia fine powder was in the form of periclase and had a degree of purity of 99.9%.

The yield of the collected magnesia powder was 90% or more.

The magnesia fine powder was placed in a mold, pre-molded under a pressure of 100 kg/cm$^2$, and then molded under a hydrostatic pressure of 1500 kg/cm$^2$. The molded magnesia body was sintered at a temperature of 1,300° C. for 3 hours under a vacuum of $10^{-4}$ torr. The resultant sintered body exhibited the density as indicated in Table 1.

TABLE 1

| Example No. | Residence time of vaporized magnesium (sec.) | Size of magnesia fine particles (μm, BET method) | Density of sintered body (g/cm$^3$) |
|---|---|---|---|
| 1 | 0.2 | 0.025 | 3.51 |
| 2 | 0.5 | 0.013 | 3.53 |
| 3 | 3.0 | 0.029 | 3.51 |

Examples 4 and 5

In each of Examples 4 and 5, the same procedures as those described in Example 1 were carried out, except that the residence time of the vaporized magnesium in the magnesium-oxidizing region 5 was 0.7 seconds and the temperature of the magnesium-oxidizing region was adjusted to the level indicated in Table 2. The yield of the collected magnesia powder was 90% or more.

The size (BET method) of the resultant magnesia fine particles and the density of the sintered body are indicated in Table 2.

TABLE 2

| Example No. | Reaction temperature (°C.) | Size of magnesia fine particles (μm BET method) | Density of sintered body (g/cm$^3$) |
|---|---|---|---|
| 4 | 800 | 0.013 | 3.52 |
| 5 | 1000 | 0.017 | 3.53 |

The sintered magnesia body obtained in Example 4 exhibited a volume resistance of $10^{-13}$ ohm -cm at a temperature 20° C., a flexual strength of 1600 kg/cm$^2$, and a total transmittance of 85% at a thickness of 1.0 mm.

Examples 6 to 8

In each of Examples 6 to 8, the same procedures of those described in Example 1 were carried out, except that the residence time of the vaporized magnesium in the magnesium-oxidizing region 5 was 0.7 seconds, the total pressure of the reaction mixture was 1.0 atm, the partial pressure of oxygen was 0.2 atm the oxidizing temperature was 1300° C., and magnesium in the magnesium-vaporizing region 10 was vaporized at the temperature as indicated in Table 3. The partial pressure of vaporized magnesium in the magnesium-oxidizing region was regulated by regulating the vaporizing temperature of magnesium. The resultant magnesia fine powder was collected in a yield of 90% or more.

The size (BET method) of the resultant magnesia fine particles and the density of the sintered magnesia body are indicated in Table 3.

TABLE 3

| Example No. | Vaporizing temperature of magnesium (°C.) | Partial pressure of vaporized magnesium (atm) | Size of magnesia fine particles (μm, BET method) | Density of sintered body (g/cm$^3$) |
|---|---|---|---|---|
| 6 | 1100 | 0.09 | 0.030 | 3.51 |
| 7 | 1000 | 0.05 | 0.020 | 3.52 |
| 8 | 800 | 0.03 | 0.015 | 3.53 |

Examples 9 to 12

In each of Examples 9 to 12, the same procedures as those described in Example 1 were carried out, with the following exception.

Magnesium was vaporized at a temperature of 900° C. The partial pressure of the vaporized magnesium in the magnesium-oxidizing region 5 was 0.04 atm and the total pressure of the reaction mixture was 1.0 atm. The residence time of the vaporized magnesium in the magnesium-oxidizing region 5 was 0.7 seconds and the oxidizing temperature was 1,000° C. The partial pressure of oxygen in the magnesia-oxidizing region 5 was as indicated in Table 4.

The resultant magnesia fine powder was collected in a yield of 90% or more.

The size (BET method) of the resultant magnesia fine particles and the density of the sintered body are indicated in Table 4.

TABLE 4

| Example No. | Partial pressure of oxygen (atmosphere) | Size of magnesia fine particles (μm, BET method) | Density of sintered body (g/cm$^3$) |
|---|---|---|---|
| 9 | 0.02 | 0.030 | 3.51 |
| 10 | 0.1 | 0.020 | 3.52 |
| 11 | 0.5 | 0.017 | 3.52 |
| 12 | 1.0 | 0.018 | 3.52 |

Comparative Example

The same procedures as those described in Example 2 were carried out, except that the oxidizing temperature was 900° C., the oxygen gas was introduced into the magnesium-oxidizing region 5 through the conduit 15 and the magnesia-collecting box 11, which had no filter, in a countercurrent relationship to the flow of the vaporized magnesium-containing argon gas, and the resultant magnesia fine powder was collected by a filter arranged in the conduit 3.

The partical pressures of the oxygen gas and the vaporized magnesium in the magnesium-oxidizing region 5 were 0.2 atm and 0.02 atm, respectively, and the total pressure of the reaction mixture was 1.0 atm and the temperature of the magnesium-oxidizing region was 900° C.

The resultant magnesia powder having a particle size of 0.070 $\mu$m (BET method) were collected by the filter in a poor yield of 15%. It was found that the non-collected amount of magnesia particles adhered on the inside surface of the magnesium-oxidizing tube and the particles had a large size of 0.15 $\mu$m (BET method).

The collected magnesia powder was molded and sintered in the same manner as that mentioned in Example 1. The resultant sintered body had an unsatisfactory density of 3.41 g/cm$^3$, a volume resistance of $10^{-13}$ ohm-cm at 20° C., and a flexual strength of 1350 kg/cm$^2$. Also, it was found that the sintered body having a thickness of 1.0 mm exhibited no transparency.

We claim:

1. A process for producing a high purity magnesia powder having an improved sintering property, comprising the steps of:
    (A) vaporizing magnesium at a temperature of 700° C. or more in a magnesium-vaporizing region while flowing an inert gas through said magnesium-vaporizing region;
    (B) introducing said inert gas containing the resultant vaporized magnesium from step (A) into a magnesium-oxidizing region;
    (C) flowing a molecular oxygen-containing gas concurrently with said vaporized magnesium-containing inert gas through said magnesium-oxidizing region to provide a reaction mixture, while maintaining the partial pressure of said vaporized magnesium in the magnesium-oxidizing region at 0.09 atmospheres or less and maintaining the partial pressure of said oxygen gas at one-half times the pressure of said vaporized magnesium or more while also maintaining the temperature in said magnesium-oxidizing region at a level of from 800° C. to 1,600° C., to oxidize said vaporized magnesium with said molecular oxygen-containing gas into a high purity magnesia fine powder having particle sizes of 0.03 $\mu$m or less;
    (D) introducing the flow of said reaction mixture containing the resultant magnesia fine powder into a magnesia-collecting region; and
    (E) collecting said high purity magnesia fine powder from said reaction mixture in said magnesia collecting region.

2. The process as claimed in claim 1, wherein said vaporized magnesium stays in said magnesium-oxidizing region for a period of from 0.2 to 3.0 seconds.

3. The process as claimed in claim 1, wherein the resultant fine magnesia powder has a degree of purity of 99.9% or more.

4. The process as claimed in claim 1, wherein said inert gas consists of at least one member selected from the group consisting of argon, halium, neon and krypton.

5. The process as claimed in claim 1, wherein said fine magnesia powder is collected by means of a filter.

6. The process as claimed in claim 1, wherein after said magnesia fine powder is collected, the gaseous residue is discharged from said magnesia-collecting region.

7. The process as claimed in claim 1, wherein said magnesium-oxidizing region is under an ambient pressure or a reduced pressure.

* * * * *

UNITED STATES PATENT AND TRADEMARK OFFICE
CERTIFICATE OF CORRECTION

PATENT NO. : 4,545,975
DATED : October 8, 1985
INVENTOR(S) : WAICHI KOBAYASHI ET AL.

It is certified that error appears in the above—identified patent and that said Letters Patent is hereby corrected as shown below:

Column 10, Claim 4, line 3, delete "halium" and insert --helium--.

Signed and Sealed this

Twenty-ninth Day of April 1986

[SEAL]

Attest:

DONALD J. QUIGG

Attesting Officer   Commissioner of Patents and Trademarks